(12) United States Patent
Franklin

(10) Patent No.: US 10,032,284 B2
(45) Date of Patent: Jul. 24, 2018

(54) SYSTEMS AND METHODS FOR FACILITATING TRACKING A TARGET IN AN IMAGED SCENE

(71) Applicant: Raytheon Company, Waltham, MA (US)

(72) Inventor: Craig R Franklin, McKinney, TX (US)

(73) Assignee: Raytheon Company, Waltham, MA (US)

( * ) Notice: Subject to any disclaimer, the term of this patent is extended or adjusted under 35 U.S.C. 154(b) by 99 days.

(21) Appl. No.: 15/165,166

(22) Filed: May 26, 2016

(65) Prior Publication Data

US 2017/0345156 A1  Nov. 30, 2017

(51) Int. Cl.
*G06T 7/20* (2017.01)
*H04N 1/60* (2006.01)

(52) U.S. Cl.
CPC ............. *G06T 7/20* (2013.01); *H04N 1/6005* (2013.01); *G06T 2207/10016* (2013.01); *G06T 2207/10024* (2013.01)

(58) Field of Classification Search
CPC ................................ G06T 7/20; H04N 1/6005
See application file for complete search history.

(56) References Cited

U.S. PATENT DOCUMENTS

| 6,621,924 B1 | 9/2003 | Ogino et al. |
| 2011/0018797 A1* | 1/2011 | Yen .......................... G06F 3/017 345/157 |

OTHER PUBLICATIONS

Stern et al., "Adaptive Color Space Switching for Tracking Under Varying Illumination," Image and Vision Computing, Elsevier, Guildford, GB, vol. 23, No. 3, pp. 353-364, Mar. 1, 2005, XP027617868.
International Search Report and Written Opinion from related PCT Application No. PCT/US2017/015610 dated Apr. 5, 2017.

* cited by examiner

*Primary Examiner* — Siamak Harandi
(74) *Attorney, Agent, or Firm* — Burns & Levinson, LLP; Joseph M. Maraia

(57) ABSTRACT

In systems and methods disclosed herein, a transform may be determined for a given target object and background in an image between a native color space of the image and a second multi-dimensional color space representing a preferred color space for a tracker. The transform may then be applied to convert a plurality of pixels in the imaged scene to the second multi-dimensional color space thereby advantageously increasing a perceived contrast by the tracker between the target object and the background.

20 Claims, 3 Drawing Sheets

Displayed Image (Grayscale)

Single Channel Tracker Image

Enhanced Tracker Image

SYSTEMS AND METHODS FOR FACILITATING TRACKING A TARGET IN AN IMAGED SCENE

BACKGROUND

The subject application relates to imaging and more particularly image based tracking. The subject application further relates to color-based image analysis.

Color values for pixels in an image can be described utilizing a multi-dimensional, e.g., three-dimensional coordinate system. The coordinate system used to represent the color information is commonly referred to as a color space. One common color space is Red, Green, and Blue. There are many other common three-dimensional color spaces such as YCbCr, YUV, HSV, and HSL color spaces, as well as color spaces in other dimensional orders such as RGBY and CMYK color spaces.

In general, it is possible to perform conversions, e.g., lossless or near lossless conversions, between color spaces (conversions between same-order color spaces are lossless whereas conversions between different order color spaces may have some redundancy or informational loss). Transforms between color-spaces may often be specified by a transform function/algorithm or a look-up table. Rotations and color space transformations are already widely available for various purposes and applications and can be easily implemented utilizing conventional processing technology.

While imaging analysis and other operations can be performed in any of the color spaces, the ease of doing so (e.g., mathematical complexity) can often vary greatly between different color spaces. Moreover, certain color spaces may provide better visualizations for a particular application such as tracking of an object in an image. Thus, preferred color spaces may often depend on the imaged scene and the analysis/operation that needs to be performed.

There are many other objective and subjective factors which may also influence selection of a preferred color space. For example, increasing color saturation in HSV is mathematically much easier than in YCbCr because saturation is already an independent dimension. Notably, in the forgoing example, a reduced mathematical load can improve processor performance and simplify the analysis/operation. By way of another example, in some imaging applications where visual tracking of an object is performed by an observer it may be preferable to transform the image color-space so as to enhance the ability of the observer to visualize/track the object (such as by increasing a visibility of the object, for example, relative to a background).

Describing color in a three-dimensional color system is analogous to describing a point in three-dimension space. Most people think of a three dimensional Cartesian coordinate system when thinking of a point in space. Like RGB, it is easy to comprehend. Depending on the problem one is trying to solve, it might not be the best coordinate system. For example, radial or spherical coordinate systems might be better for working with cylinders or spheres.

Raytheon's Multi-Spectral Targeting System (MTS) system utilizes a tracker module that only operates with pixel values in one dimension to facilitate efficient processing/analysis (in particular, the MTS system utilizes the luma channel of YCbCr from HDTV standards ITU-601 or ITU-709). This greatly simplifies the tracker and reduces throughput required.

The YCbCr color space is widely used in consumer electronics. One example is the interface known as "Component Video". That interface uses three analog coaxial lines that are red, green, and blue in color. This interface was common on HD electronics before HDMI became the standard. HDMI can also transfer data in the same color space, only using digital values instead of analog for the interface.

In this color space, the Y component of the pixel (the green cable in the Component Video interface) contains all the intensity information on the pixel. The Cr and Cb contain the color information. It is possible to produce a black and white image by just using the Y portion of the signal. This is basically equivalent to driving the color saturation of the pixel to 0. It is also equivalent to setting the Cr and Cb values to midscale and leaving them hooked up.

For monochrome imaging sources, e.g., video sources, there is no loss of information because the source data only uses one of the three dimensions in the YCbCr colorspace. In the YCbCr colorspace, the Cb and Cr are equal and midscale. However, with a color pixel there can be a loss of information. The amount of loss is dependent on the exact hue of the pixel in question. For ITU-601 the luma channel is defined as:

$$Y = 0.299 * Red + 0.587 * Green + 0.114 * Blue$$

Thus, it is possible to have a target and a background with different values in YCbCr space that have equivalent values in Y only (for example, a pure red target on a green background that is about twice the value). This is an extreme case, which is possible, but not likely. A more typical scenario is shown in FIGS. 1A and 1B below. In these images the human eye can pick out the blue color (displayed image) very easily but the gray monochrome representation of the target (tracker image) is much more difficult to visualize. The tracker module processing is impacted in a similar way by the reduced contrast of the monochrome image data.

This scenario is possible in on real imagery. It's not just with the example shown in FIGS. 1A and 1B. For example, many red targets can have problems as well. In the YCbCr colorspace, any unsaturated pixel value from black to white, including all the gray shades in between, will not exhibit this difference in perception. This is because there is no color saturation in the pixel values. Therefore the monochromatic tracker and the viewer receive the same information. Moreover, in the YCbCr colorspace there is only a small difference in perception with green values. This is mostly because the definition of the YCrCb uses a high percentage of green in the Y component. Also, in the YCbCr colorspace, target objects typically exhibit the greatest loss of contrast since target objects may include, e.g., large quantities of red and blue (including combinations such as purple). Because with those targets, information in the Cr and Cb will be at their greatest and the tracker does not receive it. To simulate this loss of contrast in real time, it should be possible to select DTV w/IC and then set the color saturation in a display to 0 (e.g., by setting the color saturation in a video encoder to 0). The video displayed should be equivalent to the video a monochromatic video tracker would receive via the Y channel.

The video tracking (AVT) subsystem in MTS is monochrome only. The Y portion of the TU output video is routed to the tracker. The entire YCrCb is output on the HD-SDI SMPTE 292. In MTS, all black and white sensors (MWIR, SWIR, DTV w/VC filter) have no Cr or Cb signal. So, in effect, the tracker "sees" exactly the same thing the sensor operator sees. The same is not true for DTV w/IC. In this configuration, the operator is provided with color information that the tracker does not receive. Because of this, some targets might appear to have sufficient contrast for AVT to work, when in reality it may be a very poor target. This is possible because the human judgment includes the color information. Sending color information to the AVT, however, isn't practical or efficient. Although getting the data to the tracker is trivial, redesigning an existing monochrome tracker to use such data would be very complicated. The tracker would have to understand the pixel value in the three dimensional color space instead of the single dimension intensity space. Moreover, increased tracker complexity would result in a higher processor load resulting in reduced efficiency. Speed is often key when it comes to tracking systems.

Thus, there exists a need for improved systems and methods for tracking an object in an imaged scene.

SUMMARY

Systems and methods are disclosed herein for facilitating tracking a target in an imaged scene. In example embodiments, a method is disclosed for tracking a target object. The method may include, e.g., (i) imaging a scene in a first multi-dimensional color space using an imaging device, the scene including the target object and a background; (ii) selecting representative color information in the first multi-dimensional color space for each of the target object and the background; (iii) determining a transform between the first multi-dimensional color space and a second multi-dimensional color space, wherein the second multi-dimensional color space is selected based on a contrast between the representative color information of the target object and the representative color information of the background along a first dimensional axis of the second multi-dimensional color space being greater than a contrast between the representative color information of the target object and the representative color information of the background along a first dimensional axis of the first multi-dimensional color space; and (iv) applying the transform to convert a plurality of pixels in the imaged scene to the second multi-dimensional color space. In some embodiments, the transform may be a rotational transform of the first color space. Advantageously, the applying the transform to convert a plurality of pixels in the imaged scene to the second multi-dimensional color space may increase a perceived contrast between the target object and the background by a tracker subsystem (e.g., by increasing the contrast in a monochromatic single color channel input to the tracker subsystem). In some embodiments, for example wherein the first multi-dimensional color space is a native YCrCb color space of the imaging device, the first dimensional axis of the first multi-dimensional color space may be a Y channel of a YCrCb color space and the first dimensional axis of the second multi-dimensional color space may be a new Y channel (Y') of a new YCrCb color space (Y'Cr'Cb').

In example embodiments, the representative color information of the target object or of the background may be determined based on a selection of a representative pixel from the imaged scene. In further embodiments, the representative color information of the target object or of the background may be determined based on a pixel average or color quantization process. In example embodiments, the representative color information may include at least a first point in the first-multidimensional color space for the target object and at least a second point in the first-multi-dimensional color space for the background. Thus, in such embodiments, the transform between the first multi-dimensional color space and the second multi-dimensional color space may be such that when the first point and second point are converted to the second multi-dimensional color space a vector between the first point and second point extends along or parallel to a dimensional axis of the second multi-dimensional color space (e.g., wherein the magnitude of a vector between the first point and second point is equal to the maximal contrast such that the maximal contrast reflected in a single channel). In further embodiments, the representative color information may include a first plurality of points in the first-multidimensional color space for the target object and a second plurality of points in the first-multi-dimensional color space for the background. In such embodiments, the transform may be determined, e.g., based on transformation of a vector average of all vectors between the first plurality of points and the second plurality of points. Furthermore, the transform may be determined so as to one of (i) maximize a summation of magnitudes of the vector projections along a first dimensional axis for all vectors between the first plurality of points and the second plurality of points or (ii) maximize a summation of largest projections for each of the vectors. In example embodiments, priority may be given to a one or more priority vectors from a set of all vectors extending between the first plurality of points and the second plurality of points in determining a set of acceptable transforms and wherein one or more secondary vectors from a set of all vectors extending between the first plurality of points and the second plurality of points may be used to determine which of the transforms in the set of acceptable transforms to apply.

In some embodiments, the second multi-dimensional color space may be selected based on the contrast between the representative color information of the target object and the representative color information of the background along the first dimensional axis of the second multi-dimensional color space being greater than each contrast between the between the representative color information of the target object and the representative color information of the background along each dimensional axis of the first multi-dimensional color space. In further embodiments, the second multi-dimensional color space may be selected such that the contrast between the representative color information of the target object and the representative color information of the background along a first dimensional axis of the second multi-dimensional color space is maximized. In yet further embodiments, the second multi-dimensional color space may be selected such that the contrast between the representative color information of the target object and the representative color information of the background along a first dimensional axis of the second multi-dimensional color space is greater than a pre-determined threshold.

In example embodiments, a monochromatic (single channel) representation of the imaged scene along the first dimensional axis of the second multi-dimensional color space may be imputed into a tracker subsystem for analysis thereof. In such embodiments, the monochromic (single channel) representation of the imaged scene along the first dimensional axis of the second multi-dimensional color space may be characterized by having greater contrast between the target object and the background than a monochromic (single channel) representation of the of the imaged scene along the first dimensional axis of the first multi-dimensional color space. In some embodiments, the monochromic (single channel) representation of the imaged scene along the first dimensional axis of the second multi-dimensional color space may be characterized by having greater contrast between the target object and the background than any monochromic (single channel) representation of the of the imaged scene along any dimensional axis of the first multi-dimensional color space.

BRIEF DESCRIPTION OF THE FIGURES

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

Systems and methods are disclosed herein for facilitating tracking a target in an imaged scene. In example embodiments, a scene may be imaged using an imaging device, e.g., a video camera, digital camera, or the like. Generally, the imaging device may provide color information for each pixel in the imaged scene in a first multi-dimensional color space, e.g., in a native color space of the imaging device.

Figure 1A:
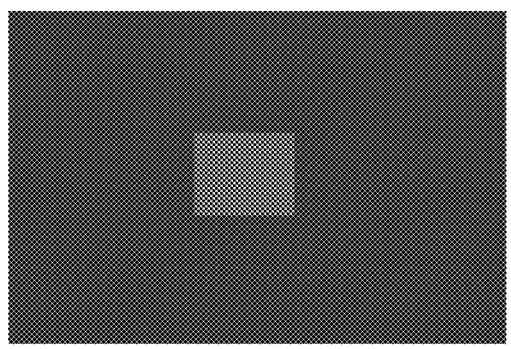
FIGS. 1A-1C depict an example illustrating how colors in a displayed image (1A) can be difficult to analyze utilizing a monochrome (single channel) tracker image (1B) in a native color space and how an enhanced tracker image (1C) can provide improved contrast for the monochrome (single channel) tracker image in a different color space.

This color information may include color information for a target object in the imaged scene as well as a background, e.g., proximal to the target object. Thus, representative color information may be selected for each of the target object and the background. Notably, representative color information may be determined based on an actual pixel from the imaged scene, a pixel average, a color quantization process for clustering points in the multi-dimensional color space, or using other analytic methods. In general, representative color information for the target object may include at least a first point in the first-multidimensional color space and representative color information for the background may include at least a second point in the first-multi-dimensional color space for the background. For example, utilizing the case of FIGS. 1A and 1B, a real world target object may be a blue car (target) on gray asphalt (background). FIG. 1A depicts a representative color information for each of the car and the asphalt (in grayscale).

In exemplary embodiments, a transform may be determined between the first multi-dimensional color space (e.g., the native color space of the imaging device) and a second multi-dimensional color space (e.g., a preferred color space for the tracker). The transform may then be applied to convert a plurality of pixels in the imaged scene to the second multi-dimensional color space (e.g., to the preferred color space for the tracker). In general, the transform may advantageously increase the perceived contrast (e.g., by the tracker) between the target object and the background. See, e.g., the enhanced tracker image of FIG. 1C (via the color space transformation) relative to the unenhanced tracker image of FIG. 1B (utilizing the original color space).

In example embodiments, the transform may be a simple rotational transform (e.g., wherein the second multi-dimensional color space is selected to be rotationally related to the first multi-dimensional color space such as about the origin of the first color space in some embodiments or about a selected center point of the first color space in other embodiments). In some embodiments, the rotational transform may be applied in two sequential steps of first rotating in a first direction, e.g., around a first axis, and second rotating in a second direction, e.g., around a second axis. Thus, in some embodiments the rotational transform may combine a first elemental rotation (about a first axis) followed by a second elemental rotation (about a second axis). This may ease the computational complexity and therefore the computational load that the rotational transform may place on the system. In other embodiments, the rotational transform may be applied in a single step, e.g., where the color space is rotated in a directions which simultaneously rotates the color space relative to a plurality of axes.

In example embodiments, the rotational transform may be applied via a rotation matrix which is used to rotate a matrix point about a rotational axis by a given angle. For example, in a three-dimensional space (XYZ) a matrix point (x, y, z) can be rotated about each of the three rotational axes (Rx, Ry and Rz) by angle ($\theta$) using a corresponding rotation matrix (see below).

$$R_x(\theta) = \begin{bmatrix} 1 & 0 & 0 \\ 0 & \cos\theta & -\sin\theta \\ 0 & \sin\theta & \cos\theta \end{bmatrix}$$

$$R_y(\theta) = \begin{bmatrix} \cos\theta & 0 & \sin\theta \\ 0 & 1 & 0 \\ -\sin\theta & 0 & \cos\theta \end{bmatrix}$$

$$R_z(\theta) = \begin{bmatrix} \cos\theta & -\sin\theta & 0 \\ \sin\theta & \cos\theta & 0 \\ 0 & 0 & 1 \end{bmatrix}$$

In particular, the matrix point is multiplied by a rotational matrix to effect the rotation. Note that for the above example, the coordinate system is right-handed, and the angle $\theta$ is positive. Thus, each of these basic vector rotations appears counter-clockwise when the axis about which they occur points toward the observer ($Rz(\theta)$ for instance, would rotate point along the x-axis toward the y-axis).

Note that for the above rotational matrixes calculations may be simplified, since each of the rotational matrix only effects rotation in two dimensions. Thus, for example for $Rz((\theta)$ it should be noted that rotation about the Z axis would only effect x and y values while z would remain constant. Accordingly, matrix multiplication of $Rz(\theta)$, e.g., can be simplified as follows:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

where x and y represent the original values and x' and y' represent post rotation values. Thus, the coordinates (x', y') of the point (x, y) after rotation may be calculated as follows.

$$x' = x \cos\theta - y \sin\theta$$

$$y' = x \sin\theta + y \cos\theta$$

As demonstrated above, in order to define a rotational transform about a coordinate axis all that is needed is to determine the angle ($\theta$).

Notably, where the above examples are specific to rotations above a coordinate axis, rotation can also be generalized with respect to rotating above a generic axis (such as defined by a unit vector ($u_x$, $u_y$, $u_z$). Thus, for rotation of an angle ($\theta$) about a generic axis defined by unit vector ($u_x$, $u_y$, $u_z$) the matrix of rotation is given as follows:

$$R = \begin{bmatrix} \cos\theta + u_x^2(1-\cos\theta) & u_x u_y(1-\cos\theta) - u_z \sin\theta & u_x u_z(1-\cos\theta) + u_y \sin\theta \\ u_y u_x(1-\cos\theta) + u_z \sin\theta & \cos\theta + u_y^2(1-\cos\theta) & u_y u_z(1-\cos\theta) - u_x \sin\theta \\ u_z u_x(1-\cos\theta) - u_y \sin\theta & u_z u_y(1-\cos\theta) + u_x \sin\theta & \cos\theta + u_z^2(1-\cos\theta) \end{bmatrix}.$$

Thus all that is necessary to define a rotational transform about a generic axis is the direction of the axis and the rotation angle ($\theta$).

As described herein the systems and methods of the present disclosure allow for the determination of a rotational transform between a first multi-dimensional color space and a second multi-dimensional color space such that a contrast between representative color information of a target object and representative color information of a background is increased/maximized along a coordinate axis of the second multi-dimensional color space (e.g., relative to contrast along a corresponding coordinate axis of the first multi-dimensional color space). Thus, the systems and methods described herein may advantageously calculate rotational parameters, such as the rotation angle ($\theta$), that achieve this goal. Then, using the determined parameters, the rotational transform may be applied to each of the original pixel values in an image. Note that in some embodiments, only a single channel result may be desired. Thus, in some embodiments, the rotational transform may be applied in calculating out pixel values for a single channel. Additional information regarding determining parameters for a rotational transform and applying the transform are provided in the examples which follow.

In further exemplary embodiments, the transform may be more complex than a simple rotational transform. For example, in some embodiments, translational and or scaling transforms may be utilized, such as in conjunction with a rotational transform, e.g., to optimize contrast along a dimensional axis. In some embodiments, it is mathematically possible to rotate the color space such that a vector between representative color data for the target object and representative color data for the background, lies along or parallel to one axis of a new coordinate system. By converting pixels in the relevant region of the image to the new rotated color space, the tracker can be provided with values from this one axis of the new coordinate system (as a monochromatic single channel). The rotated vector, however, may have rotated out of defined values for a given color space definition (e.g., in YCbCr, Y values are expected to be in the range of 16 to 235 and Cb and Cr values are expected to be in a range from 16 to 240). Thus, in some embodiments, a translational offset may be calculated so as to reposition the transformed vector into an acceptable range of values for the given color space definition. This may include, e.g., calculating an offset between a center point of the color space (e.g., for YCbCr at (125.5, 128, 128) and a center point of the vector. The offset may then be used to effect a translational transform with respect to the each of the pixel values in an image. Note that the translational transform may be applied before or after the rotational transform. Note that in some instances, even after the translational offset the rotated vector may still be outside of the range of permissible values. For example, in some embodiments, the maximal contrast may exceed the allowable range along a given axis (for example, may exceed the 8-bit defined maximum contrast of a Y channel in a YCbCr color space). Thus, in such embodiments, it may be advantageous to rescale the axis (e.g., apply a scaling transform) so as to avoid clipping of relevant data. In preferred embodiments, a gain value may be calculated such that the maximal contrast utilizes approximately a predetermined percentage (e.g., two thirds) of the available output range. This may advantageously allow for some head room/foot room. In further example embodiments, gain may be limited, e.g., to between 0.5× to 2×.

In example embodiments, the tracker may be a monochrome tracker configured to analyze/processes color information along a single color channel of an input image (e.g., along a single dimensional axis of the color space of the input image). Thus, in example embodiments, the second multi-dimensional color space may be selected based on a contrast between the representative color information of the target object and the representative color information of the background along a first dimensional axis of the second multi-dimensional color space being greater than a contrast between the between the representative color information of the target object and the representative color information of the background along a first dimensional axis of the first multi-dimensional color space. In this way a monochromic (single channel) representation of the imaged scene along the first dimensional axis of the second multi-dimensional color space would have greater contrast between the target object and the background than a monochromic (single channel) representation of the of the imaged scene along the first dimensional axis of the first multi-dimensional color space.

Moreover, in some embodiments, the contrast between the representative color information of the target object and the representative color information of the background along the first dimensional axis of the second multi-dimensional color space may be greater than each contrast between the between the representative color information of the target object and the representative color information of the background along each dimensional axis of the first multi-dimensional color space. In this way a monochromic (single channel) representation of the imaged scene along the first dimensional axis of the second multi-dimensional color space would have greater contrast between the target object and the background than any monochromic (single channel) representation of the of the imaged scene along any dimensional axis of the first multi-dimensional color space.

In example embodiments, the second multi-dimensional color space may be selected so as to substantially maximize contrast between the representative color information of the target object and the representative color information of the background along a first dimensional axis of the second multi-dimensional color space. In some embodiments, the second multi-dimensional color space may be selected so as to ensure a contrast between the representative color information of the target object and the representative color information of the background along a first dimensional axis of the second multi-dimensional color space is greater than a pre-determined threshold.

As noted above, the representative color information generally includes at least a first point in the first-multidimensional color space for the target object and at least a second point in the first-multi-dimensional color space for the background. The maximal contrast between the first point and second point may be represented by the magnitude of a vector between the two points. Notably, the effective monochromatic contrast for each of the color channels (e.g., along each of the dimensional axes) is therefore represented by the magnitudes of the projections of the vector on each of the dimensional axes. Notably, unless the vector lies completely within a dimensional axis of the color space, the effective monochromatic contrast will be less than the maximal contrast. A goal of the color space transformation disclosed herein is to rotate or otherwise transform the first color space into a second color space such that the monochromatic contrast for one of the channels (e.g., along a first dimensional axis) in the second color space is closer (as compared to the first color space) or equal to the maximal contrast. In example embodiments, a transform may be applied between the first multi-dimensional color space and the second multi-dimensional color space such that when the first point and second point are converted to the second multi-dimensional color space the maximal contrast vector between the first point and second point extends along or parallel to a first dimensional axis of the second multi-dimensional color space.

In some embodiments, the representative color information may include a first plurality of points in the first-multidimensional color space for the target object and/or a second plurality of points in the first-multi-dimensional color space for the background. In some embodiments, a transform may be determined based on transformation of a vector average of all vectors between the first plurality of points and the second plurality of points. In other embodiments a transformation may be determined that maximizes a summation of the magnitudes of the vector projections along a first dimensional axis for all vectors between the first plurality of points and the second plurality of points. In yet further embodiments, a transformation may be determined that maximizes the summation of the largest projections (e.g., along any of the axis) for each of the vectors.

In example embodiments, priority may be given to a one or more priority vectors from the set of all vectors extending between the first plurality of points and the second plurality of points (for example, representing dominants background color, dominant target color pair(s)). Thus, the transform may be applied such that contrast is maximized or achieves a given threshold along a first dimensional axis of the second color space for the one or more priority vectors. Notably, in some embodiments a plurality of transforms, e.g., rotational transforms, may achieve the same maximization of contrast (e.g., each along different dimensional axis) or thresholding requirement. Thus, in some embodiments, one or more secondary vectors from the set of all vectors extending between the first plurality of points and the second plurality of points may be used to determine which of the transforms to apply (e.g., based on contrast maximization or thresholding along the first dimensional axis or a different dimensional axis of the second color space for the one or more secondary vectors). This process may be iteratively extended, e.g., to one or more tertiary vectors.

Figure 2:
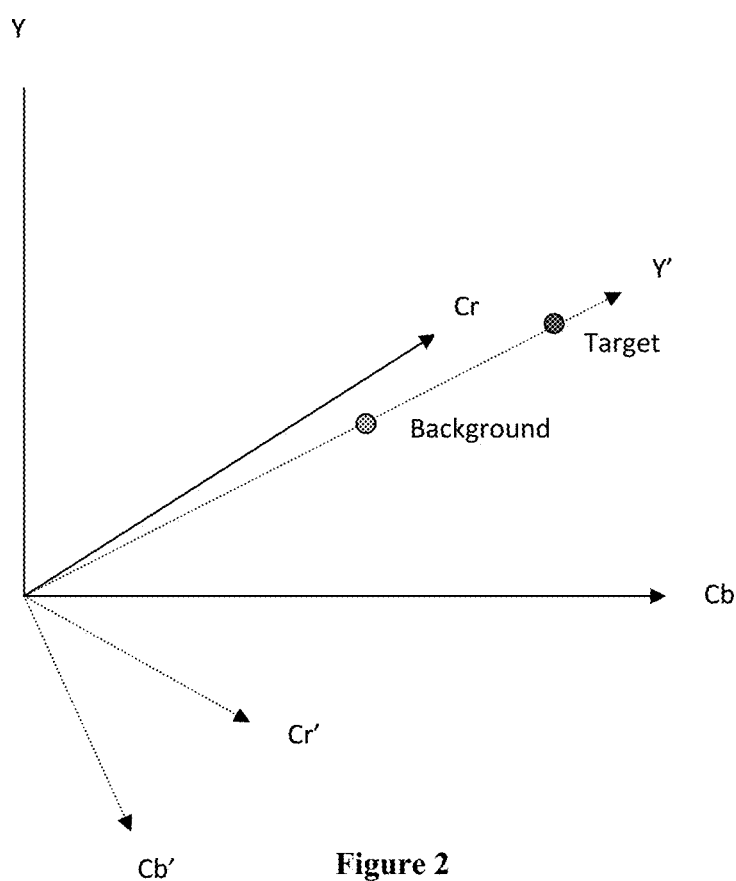
FIG. 2 depicts an example implementation of a color space transform, according to the present disclosure.

With reference not to FIG. 2, an example implementation of a color space transform according to the systems and methods of the present disclosure, is depicted. In the depicted embodiment, the native color space is the YCbCr colorspace. The representative color information in the native color space is as follows:

the representative color information in the native color space for the target is blue ($Y_{709}=30$, $Cr_{709}=118$, $Cb_{709}=233$); and the representative color information in the native color space of the background is gray ($Y_{709}=50$, $Cr_{709}=128$, $Cb_{709}=128$)

Figure 1B:
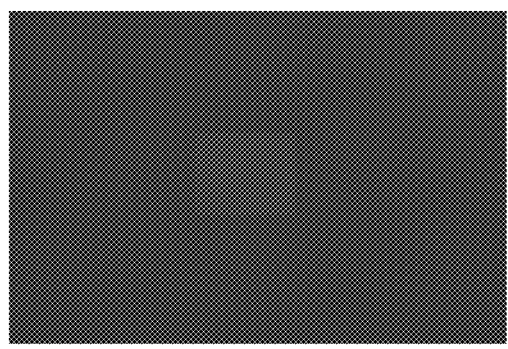

FIG. 1A depicts a grayscale image of original target (blue) and background (gray) colors. Notably, the target and background colors in FIG. 1A corresponded to the original (pre-transform) colors for the target and background as represented in the native color space of FIG. 2. FIG. 1B depicts a monochromatic channel perspective (Y channel) for the original (pre-transform) colors for the target and background as represented in the native color space of FIG. 2. Notably, the contrast in the Y channel is only 20 (50−30).).

Figure 1C:
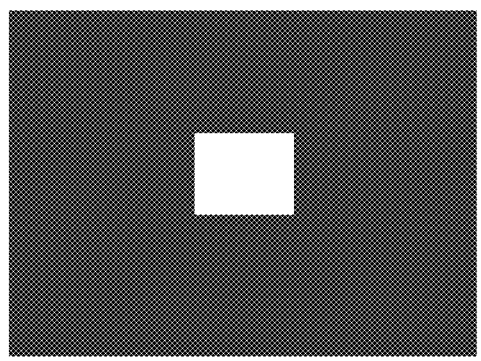

In example embodiments, a rotational transform may advantageously be applied to increase/maximize contrast along a particular color channel (in this case the Y channel). In particular, the rotational transform may rotate the color space so that a vector extending between the background and target colors lies parallel to an axis in the transformed color space (e.g., along a Y' axis). By applying a rotational transform to the example in FIG. 2, a new color space (Y'Cb'Cr') may be determined such that the vector extending between the background and target color lies along the Y' axis. Thus, converting the target and background colors into the new color space, the following new color values are achieved:

the new color information (Target') for the target in the rotated color space is $Y'_{709}=212$, $Cr'_{709}=72$, $Cb'_{709}=137$; and the new color information (Background') for the background in the rotated color space is $Y'_{709}=104$, $Cr'_{709}=72$, $Cb'_{709}=137$ Here the Y' channel contrast is 208 (corresponding to the example of FIG. 1C). Moreover, the difference in the color channels Cr' and Cb' for the target and background colors is now zero meaning that the maximal contrast information between the target and background is fully reflected in the Y' channel. Thus, the Y' channel may be utilized by a single channel monochromatic tracker without resulting in informational degradation/loss of contrast.

Figure 3A:
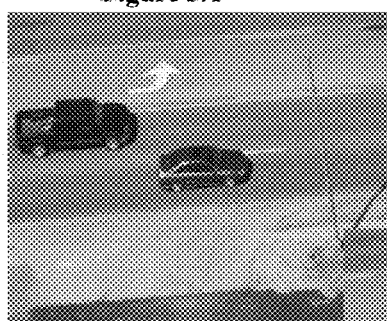
FIGS. 3A-3C depict a real world example of a color space transform, according to the present disclosure.
Figure 3B:
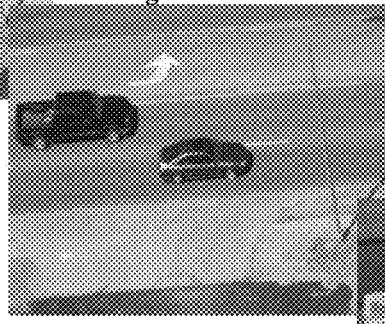
Figure 3C:

FIGS. 3A-3D depict a real world example implementation of a color transformation as disclosed herein. In particular, FIG. 3A depicts a segmented region of an image including a target object and a background in a grayscale representation of the native color space. FIG. 3B then depicts the unenhanced tracker image (e.g., Y channel representation of the segmented region). Finally, FIG. 3C depicts the advantageous enhanced tracker image (e.g., Y' channel representation of the segmented region based on the color space transformation). Note the increased contrast of the tracker image of FIG. 3C relative to the tracker image of FIG. 3B. In example embodiments, post processing techniques may be applied to transformed image data (e.g., to increase/maximize saturation for the transformed channel).

Another example implementation of the systems and methods of the present disclosure is provided in the following sections. At a first step representative colors are selected for the background and the target. This may be achieved any number of different ways. For example, in some embodiments a region of an image that contains a target to be tracked may be identified. This may be implemented, for example, via a software program configured to define a boundary between a selected region of an image and a non-selected region of the image (note that this boundary may also be referred to as a "gate"). Advantageously, that the defining of the gate may be automatic (e.g., based on a preprogrammed algorithm), user based (e.g., via a user interface) or a combination of the two. In some embodiments, a gate may defined for a frame of a video (e.g., a user may analyze and select a gate for a frame in a displayed unprocessed Y portion of a video). In preferred embodiments, a gate may be defined for each of a plurality of frames in the video.

In general, a gate may define a boundary between image pixels in a region of an image which fully encompasses the target and image pixels in a background region proximal to the target. Thus, in some embodiments, representative color information for the target may be calculated by processing color information relating to the image pixels contained within the gate and representative color information for the background may be calculated by processing color information relating to the image pixels outside of the gate. In some embodiments, this processing may be automatic and may implemented using firmware to increase the processing speed thereof. For example, in some embodiments a software component may feed gate information (e.g., gate size and/or position) to a firmware component of a tracking system. The firmware may then be configured to determine an initial (e.g., real-world) color value for the target and an initial (e.g., real-world) color value for the background.

In example embodiments, a color value for the target may be determined based a subset of pixels within the gate for example based on an average color value for the subset of pixels. Thus, in some embodiments, a subset of pixels within the gate may be determined by identifying those pixel(s) within the gate with the highest color saturation (color saturation for a pixel may, for example, be estimated in YCbCr color space by multiplying a Y value for the pixel by the max of the chroma for the pixel, which is the absolute value of Cb/Cr). In some embodiments, a threshold may be applied to determine those pixel(s) which have the highest color saturation (e.g., based a threshold saturation value and/or based on threshold number or percentage of the pixels).

Similarly, in example embodiments, a color value for the background may be determined based on a subset of pixels outside of the gate, for example based on an average color value for the subset of pixels. Thus, in some embodiments, a subset of pixels outside of the gate may be identified based on proximity to the gate (e.g., any pixel outside the gate within a threshold number of pixels of the gate, such as within four pixels of the gate).

In general, the initial color values for the target and the background may be determined in a native color space for an imaging device, for example, in a native RGB or YCbCr color space for the imaging device. In some embodiments, the native color space of the imaging device may be a true-color space (i.e., providing substantially natural color rendition so that the image approximates human visual perception of the imaged scene). In other embodiments, the native color space of the imaging device may an enhanced/modified or otherwise false color space (i.e., providing color rendering where that the image does not match real-world visual perceptions of the imaged scene).

For the purposes of the present example, consider the following initial color values for a target and background of an image in a native RGB color space (characterized by red (R) green (G) and blue (B) values ranging from 0 to 255):

|   | Background | Target |
|---|---|---|
| R | 0 | 80 |
| G | 0 | 80 |
| B | 255 | 80 |

Viewed in the context of an equivalent YCbCr color space (which may typically be a native color space for a surveillance video), the initial color values for the background and target colors may be represented as follows:

|   | Background | Target | Difference |
|---|---|---|---|
| Y | 31.81 | 84.72 | 52.91 |
| Cb | 239.945 | 128 | −111.945 |
| Cr | 117.8 | 128 | 10.2 |

The initial color values for the background and the target colors may be plotted in the native color space to define a three-dimensional vector extending between therebetween (also known herein as a maximal contrast vector). As shown above, a tracking system may be configured to calculate a difference between the initial color value of the target and the initial color value of the background for each of the channels in the native color space (this difference may be provided as a signed magnitude for each channel). Advantageously, this calculation may be implemented via a firmware component of the tracking system to increase the processing speed thereof.

Note that the Y channel, which is typically used with the AVT of MTS includes a contrast difference of only 52.91. The vector magnitude (maximal contrast difference), however is 124.24 (as calculated based on the square root of the sum of the differences in each channel squared, i.e., the square root of ($52.91^2 + -111.945^2 + 10.2^2$)). Thus, using the Y channel in this instance would represent a significant loss of contrast information.

Thus, a rotational transform may be calculated so as to rotate the maximal contrast vector such that the vector is parallel to a post-translational Y axis thereby maximizing contrast along the Y channel. In some embodiments, this may be implemented utilizing a single rotational transform, e.g., along a generic rotational axis perpendicular to a plain defined by the vector and the Y axis. Thus, in such embodiments a unit vector may be determined representing the generic rotational axis and an angle (θ) between the maximal contrast vector and the Y axis may be calculated. These parameters may then be utilized in applying the rotational transformation to individual pixel values (e.g., utilizing a rotational matrix as described above).

In other embodiments, it may be advantageous from a computational standpoint to perform step-wise rotations along each of the Cr and Cb axes, sequentially so as to achieve the desired rotational transformation of the maximal contrast vector. Thus, in some embodiments, a first transform may be determined to rotate the vector relative to a first coordinate axis of rotation (e.g., the Cr axis) until the vector is parallel to a plane defined by the Y axis and the first coordinate axis of rotation. Next a second transform may be determined to rotate the vector relative to the second coordinate axis of rotation (e.g., the Cb axis) until the vector is parallel to a plane defined by the Y axis and the second coordinate axis of rotation. In this way applying both transforms in sequence will result in the maximal contrast vector being parallel to the Y axis. Notably, an angle of rotation must be determined for each of the step-wise rotational transforms. The advantage of step-wise rotations is one of reducing computational complexity so as to best utilize resources, e.g., in a given firmware architecture.

An example implementation of step-wise rotational transforms is provided below. As a first transform, the maximal contrast vector is rotated above the Cr axis, e.g., rotating counter-clockwise Cb toward Y. This is done to obtain contrast information from the Cb channel component of the vector into the Y channel. For the purposes of calculations the differences between the initial color value of the target and the initial color value of the background for each of the channels in the native color space may be utilized to calculate the appropriate rotational angles. Thus for the first transform about the Cr axis, Theta1 may be calculated based on the arctangent of the $(Cb_{target}-Cb_{background})/(Y_{target}-Y_{background})$ which equals:

arctan (−111.945/52.91)=64.703 degrees or 1.129 radians. (Note the sign chance in the angle given counter-clockwise rotation). Theta1 may then be utilized to calculate COS and SIN values for the angle as noted below. Note that a Coordinate Rotation Digital Computer (CORDIC) may be utilized in calculating Theta1 and SIN and COS values thereof. These values may then be utilized to determine parameters for the transform matrix for rotation about the Cr axis (the transform matrix is also shown below).

| | Rotate CB to Y | | |
|---|---|---|---|
| | | | Radians |
| | Degrees | COS | SIN |
| | 1.129273 | 64.7025767 | 0.42731721 | 0.904101768 |
| Transform | 0.42731721 | −0.90410177 | 0 | |
| | 0.90410177 | 0.42731721 | 0 | |
| | 0 | 0 | 1 | |

The first transform may then be applied, e.g., to determine Y Cb and Cr values for the background and the target in the new color space Y'Cb'Cr' where Cr' stays the same as Cr and Y' and Cb' values are calculated as:

$Y'=Y\ COS(Theta1)-Cb\ SIN(Theta1)$ and $Cb'=Y\ SIN(Theta1)+Cb\ COS(Theta1)$

Thus, applying the transform results in the new color space Y'Cb'Cr' the following transformed values are obtained for the background and target:

| | Background | Target | Difference |
|---|---|---|---|
| Y' | −203.341738 | −79.5227126 | 123.819026 |
| Cb' | 131.292104 | 131.292104 | 0 |
| Cr' | 117.8 | 128 | 10.2 |

Notice that the difference in the Cb channel is now completely reflected in the difference in the Y' channel (i.e., the difference in the Cb' channel is now 0). Thus, the difference reflected in the Y' channel (123.82) has greatly increased relative to the previously noted difference in the Y channel (52.91).

A similar transformation process can be applied with respect to determining a second rotational transform around the Cb axis. In particular, Theta2 may be calculated based as the arctangent of the $(Cr_{target}-Cr_{background})$ $(Y_{target}-Y_{background})$ which equals:

arctan (10.2/123.819026)=−4.7093 degrees or −1.129 radians. (Note the sign chance in the angle given counter-clockwise rotation).

Theta2 may then be utilized to calculate COS and SIN values for the angle as noted below. Note that a Coordinate Rotation Digital Computer (CORDIC) may be utilized in calculating Theta2 and SIN and COS values thereof. These values may then be utilized to determine parameters for the transform matrix for rotation about the Cb axis (the transform matrix is also show below).

| | Rotate CR to Y | | | |
|---|---|---|---|---|
| | Radians | Degrees | COS | SIN |
| | −0.0821927 | −4.70929502 | 0.99662408 | −0.08210019 |
| Transform | 0.99662408 | 0 | 0.08210019 | |
| Matrix | 0 | 1 | 0 | |
| | −0.08210019 | 0 | 0.99662408 | |

The second transform may then be applied, e.g., to determine Y Cb and Cr values for the background and the target in the new color space Y"Cb"Cr" where Cb" stays the same as Cb' and Y" and Cr" values are calculated as:

$Y''=Y'\ COS(Theta2)+Cr\ SIN(Theta2)$ and $Cb''=-Y'\ SIN(Theta2)+Cr\ COS(Theta2)$ Thus, applying the transform results in the new color space Y"Cb"Cr" the following transformed values are obtained for the background and target

| | Background | Target | Difference |
|---|---|---|---|
| Y" | −192.983871 | −68.745426 | 124.238445 |
| Cb" | 131.292104 | 131.292104 | 0 |
| Cr" | 134.096712 | 134.096712 | 0 |

As noted above, in some embodiments the rotational transformation can also be applied as a single step. At the end of the process the Y' difference is increased to match the maximal contrast difference (124.24) and the Cb' and Cr' differences are 0. The resulting signal strength increase when comparing Y to Y' is 134.81%. The transformation(s) can then be applied all or a selection of the pixels in the video image. In example embodiments, the video image may be segmented, e.g., automatically, into discrete regions (e.g., each relating to a different target as defined by a gate). Each of these regions may be processed separately.

By way of reference the transformed color data of the forgoing example can be converted back to RGR data

| (R'G'B') | Background | Target | Difference |
|---|---|---|---|
| R' | −233.609247 | −88.9460019 | 144.663245 |
| G' | −249.594669 | −104.931424 | 144.663245 |
| B' | −236.703279 | −92.0400339 | 144.663245 |

As noted above, in some embodiments, the tracking system may calculate a translational offset which may be applied by way of a translational transform performed in conjunction with the rotational transform. Advantageously the translational offset may be determined based on the offset needed used to center a midpoint of the rotated maximal contrast vector relative to a center of the color space, i.e., so as to mitigate clipping. Note that digital representations of YCbCr signals are typically scaled, rounded and include an offset. For example, as noted above, a typical 8-bit digital representation of a YCbCr signal includes Y values that range from 16 to 235 and Cb and Cr values that range from 16 to 240. Thus, a center point of the YCbCr color space in 8-bit digital form is Y=(16+235)/2 and Cb and Cr=(16+240)/2 or (Y, Cb, Cr)=(125.5, 128, 128). A translational offset may therefore be calculated based on the difference between the center point of the YCbCr color space and a midpoint of the vector:

$Y$ offset=125.5−(Target $Y''$+Background $Y''$)/2

$Cb$ offset=128−(Target $Cb''$+Background $Cb''$)/2

$Cr$ offset=128−(Target $Cr''$+Background $Cr''$)/2

Thus, for example, plugging in for the example initial color values provided above, the translational offset for Y may be calculated as:

$Y$offset=125.5−(−68.745426+−192.983871)/2=256.4

Applying the transform to the Y" values above the following results are achieved:

|  | Background | Target | Difference |
|---|---|---|---|
| Y" translated | 63.4 | 187.7 | 124.3 |

Note that the translated background and target colors values now fall within an acceptable range for a YCbCr color space. In some embodiments, further transforms may be applied, e.g., a scaling transform. In particular, in some embodiments a gain value may be calculated such that the maximal contrast utilizes approximately a predetermined percentage (e.g., two thirds) of the available output range. In the above example, the maximal contrast is 124.3 while the available output range is 16 to 235. Thus a gain value of approximately 1.2 may be applied to achieve two thirds of the available output range (i.e., (((2/3)(235−16))/124.3)=1.2). Note that in some embodiments, translational and/or scaling transforms may not be required/applied.

The systems and methods of the present disclosure have advantages over systems and methods which only select (without transformation) an optimal monochromatic channel for analysis. For example, while a monochromatic tracker may select a red channel input of an RGB signal for the purposes of tracking a red car this often requires assumption with respect to Hue and may still result in loss of contrast.

While the systems and methods of the present disclosure have been particularly shown and described with reference to example embodiments thereof, it will be understood by those skilled in the art that various changes in form and details may be made therein without departing from the scope of the present disclosure.

The invention claimed is:

1. A method of tracking a target object, comprising:
imaging a scene in a first multi-dimensional color space using an imaging device, the scene including the target object and a background;
selecting representative color information in the first multi-dimensional color space for each of the target object and the background;
determining a transform between the first multi-dimensional color space and a second multi-dimensional color space, wherein the second multi-dimensional color space is selected based on a contrast between the representative color information of the target object and the representative color information of the background along a first dimensional axis of the second multi-dimensional color space being greater than a contrast between the representative color information of the target object and the representative color information of the background along a first dimensional axis of the first multi-dimensional color space; and
applying the transform to convert a plurality of pixels in the imaged scene to the second multi-dimensional color space,
wherein the transform is a rotational transform of the first color space.

2. The method of claim 1, wherein the first dimensional axis of the first multi-dimensional color space is a Y channel of a YCrCb color space and the first dimensional axis of the second multi-dimensional color space is a new Y channel (Y') of a new YCrCb color space (Y'Cr'Cb').

3. The method of claim 1, wherein the first multi-dimensional color space is a native YCrCb color space of the imaging device.

4. The method of claim 1, wherein the representative color information of the target object or of the background is determined based on a selection of a representative pixel from the imaged scene.

5. The method of claim 1, wherein the representative color information of the target object or of the background is determined based on a pixel average or color quantization process.

6. The method of claim 1, wherein the applying the transform to convert a plurality of pixels in the imaged scene to the second multi-dimensional color space increases a perceived contrast between the target object and the background by a tracker subsystem.

7. The method of claim 6, wherein the applying the transform to convert a plurality of pixels in the imaged scene to the second multi-dimensional color space increases the contrast in a monochromatic single color channel input to the tracker subsystem.

8. The method of claim 1, wherein the second multi-dimensional color space is selected based on the contrast between the representative color information of the target object and the representative color information of the background along the first dimensional axis of the second multi-dimensional color space being greater than each contrast between the representative color information of the target object and the representative color information of the background along each dimensional axis of the first multi-dimensional color space.

9. The method of claim 1, wherein the second multi-dimensional color space is selected such that the contrast between the representative color information of the target object and the representative color information of the background along a first dimensional axis of the second multi-dimensional color space is maximized.

10. The method of claim 1, wherein the second multi-dimensional color space is selected such that the contrast between the representative color information of the target object and the representative color information of the background along a first dimensional axis of the second multi-dimensional color space is greater than a pre-determined threshold.

11. A method of tracking a target object, comprising:
imaging a scene in a first multi-dimensional color space using an imaging device, the scene including the target object and a background;

selecting representative color information in the first multi-dimensional color space for each of the target object and the background;

determining a transform between the first multi-dimensional color space and a second multi-dimensional color space, wherein the second multi-dimensional color space is selected based on a contrast between the representative color information of the target object and the representative color information of the background along a first dimensional axis of the second multi-dimensional color space being greater than a contrast between the representative color information of the target object and the representative color information of the background along a first dimensional axis of the first multi-dimensional color space; and applying the transform to convert a plurality of pixels in the imaged scene to the second multi-dimensional color space, wherein the representative color information includes at least a first point in the first-multidimensional color space for the target object and at least a second point in the first-multi-dimensional color space for the background.

12. The method of claim 11, wherein the transform between the first multi-dimensional color space and the second multi-dimensional color space is such that when the first point and second point are converted to the second multi-dimensional color space a vector between the first point and second point extends along or parallel to a dimensional axis of the second multi-dimensional color space.

13. The method of claim 12, wherein the magnitude of a vector between the first point and second point is equal to the maximal contrast.

14. The method of claim 11, wherein the representative color information includes a first plurality of points in the first-multidimensional color space for the target object and a second plurality of points in the first-multi-dimensional color space for the background.

15. The method of claim 14, wherein the transform is determined based on transformation of a vector average of all vectors between the first plurality of points and the second plurality of points.

16. The method of claim 14, wherein the transform is determined so as to one of (i) maximize a summation of magnitudes of the vector projections along a first dimensional axis for all vectors between the first plurality of points and the second plurality of points or (ii) maximize a summation of largest projections for each of the vectors.

17. The method of claim 14, wherein priority is given to a one or more priority vectors from a set of all vectors extending between the first plurality of points and the second plurality of points in determining a set of acceptable transforms and wherein one or more secondary vectors from a set of all vectors extending between the first plurality of points and the second plurality of points may be used to determine which of the transforms in the set of acceptable transforms to apply.

18. The method of claim 1, wherein a monochromatic (single channel) representation of the imaged scene along the first dimensional axis of the second multi-dimensional color space is imputed into a tracker subsystem for analysis thereof.

19. The method of claim 18, wherein the monochromic (single channel) representation of the imaged scene along the first dimensional axis of the second multi-dimensional color space is characterized by having greater contrast between the target object and the background than a monochromic (single channel) representation of the of the imaged scene along the first dimensional axis of the first multi-dimensional color space.

20. The method of claim 18, wherein the monochromic (single channel) representation of the imaged scene along the first dimensional axis of the second multi-dimensional color space is characterized by having greater contrast between the target object and the background than any monochromic (single channel) representation of the of the imaged scene along any dimensional axis of the first multi-dimensional color space.

\* \* \* \* \*